United States Patent
Lin et al.

(10) Patent No.: US 6,819,222 B2
(45) Date of Patent: Nov. 16, 2004

(54) INVENTORY CONTROL SYSTEM USING R.F. OBJECT IDENTIFICATION

(75) Inventors: Fong-Jei Lin, Saratoga, CA (US); Shengbo Zhu, San Jose, CA (US)

(73) Assignee: Magnex Corp., San Jose, CA (US)

(*) Notice: Subject to any disclaimer, the term of this patent is extended or adjusted under 35 U.S.C. 154(b) by 0 days.

(21) Appl. No.: 09/506,509

(22) Filed: Feb. 17, 2000

(65) Prior Publication Data

US 2003/0132835 A1 Jul. 17, 2003

Related U.S. Application Data

(62) Division of application No. 09/161,175, filed on Sep. 25, 1998.

(51) Int. Cl.[7] .................................................. H04Q 5/22
(52) U.S. Cl. .................. 340/10.31; 340/5.72; 340/7.55; 340/10.1; 235/385
(58) Field of Search ................................ 340/5.92, 5.72, 340/825.36, 10.1, 10.3, 7.55, 7.56; 235/385

(56) References Cited

U.S. PATENT DOCUMENTS

| | | | | |
|---|---|---|---|---|
| 4,049,950 A | * | 9/1977 | Byrne et al. | 235/61.6 R |
| 4,209,783 A | * | 6/1980 | Ohyama et al. | 340/152 |
| 4,961,533 A | * | 10/1990 | Teller et al. | 177/25.19 |
| 5,012,224 A | * | 4/1991 | Drucker | 340/551 |
| 5,887,176 A | * | 3/1999 | Griffith et al. | 395/750 |
| 6,361,396 B1 | * | 3/2002 | Snyder et al. | 446/397 |
| 6,362,737 B1 | * | 3/2002 | Rodgers et al. | 340/572.1 |

* cited by examiner

Primary Examiner—Michael Horabik
Assistant Examiner—Matsuichiro Shimizu

(57) ABSTRACT

An object circuit for use in an r.f. identification system for locating a specific object by generating identification signals of a specific frequency assigned to a given object, said object circuit including a receiving antenna, a crystal coupled to said receiving antenna, said crystal having a resonant frequency equal to the frequency assigned to the associated object, and circuitry coupled to said crystal for responding to a signal of said assigned frequency received by said object circuit.

2 Claims, 5 Drawing Sheets

INVENTORY CONTROL SYSTEM USING R.F. OBJECT IDENTIFICATION

CROSS-REFERENCE TO RELATED CASES

This application is a divisional application of, and claims priority from, U.S. patent application Ser. No. 09/161,175 filed Sep. 25, 1998.

BACKGROUND OF THE INVENTION

This invention relates to inventory control systems in general, and in particular to an improved inventory control system using R.F. object identification.

Inventory control systems are used generally to keep track of items ("objects") in a collection of items. For example, an automobile parts warehouse at any given time has a collection of vehicle parts ("objects") in inventory. The kind and number of such parts varies every day, as currently inventoried parts are sold and new parts are received. In order to keep track of the number and kind of vehicle parts in inventory, some type of inventory control system must be used. Similarly, in a semiconductor manufacturing operation, at any given time there is a collection of integrated circuits ("objects") of one or more types located somewhere in the facility, which must be accounted for using an inventory control system. Similar requirements exist for containerized shipping operations and other warehousing and manufacturing operations. In most airports, there is a requirement for keeping track of luggage and articles in transit through the system, from the hands of a passenger or messenger arriving at the airport to the final destination of the luggage or article.

In all examples of known inventory control systems, either the containers for the different objects or the objects themselves (or both) are usually provided with some type of human readable or machine readable identification indicia, such as a label or tag affixed to the object or the container. In more sophisticated systems, a computer is used to assist in keeping track of the objects. When an object is removed from the actual location, or passes from one location to another, some procedure is typically used to note the fact that the location status of the object has changed. This is accomplished either by operator entry of the change into a manual log or the system computer, or by using tag or label reading devices (e.g., bar code readers) to enter the information into the system computer. All known inventory control systems suffer from several disadvantages. For example, once a new item has been tagged, the current location of that item must be entered into an inventory list, either manually or automatically. Manual entry of the location and correlation of the location with the specific item is subject to human error. Automatic entry of such information requires a label or tag reader either at the location itself, or some way of verifying that the item identification and associated location information are correct. In addition, when an item is removed from a current location, some arrangement must be made to ensure that this change of inventory status is noted in the master list, again either manually or automatically. Automatic systems using coded marker tags or labels are also subject to erroneous code reading due to contamination or obliteration of the coded markings or even partial obscuring of these markings due to rough handling procedures. Perhaps most importantly, current inventory control systems do not provide a simple and efficient way to find a desired object stored somewhere in a large collection of different objects, such as inventoried items in a large warehouse or manufacturing facility.

SUMMARY OF THE INVENTION

The invention comprises an inventory control system which is devoid of the above-noted limitations and disadvantages, which can be implemented using objects and object containers of any physical size and shape, which can be installed in any inventory storage facility regardless of size, and which has several features absent from known inventory control systems.

In a broadest aspect the invention comprises an inventory control system which uses R.F. sensitive circuits to maintain inventory control of all objects in a collection of objects. Each object has an associated R.F. sensitive circuit which resonates at a specific frequency unique to that class or genus of objects when an R.F. signal at that particular frequency is received by the circuit, and a transmitter for generating an acknowledgement signal to an inventory control reader for identifying the object and the present location of the object.

The circuit also includes a unique identifier, such as a multi-digit number or a set of alphabetic or alpha numeric characters, stored in a non-volatile memory, which serves to identify that particular item in a collection of like items. Thus, for example, in an automotive parts warehousing installation, all carburetors of a particular type are assigned a particular frequency, and each individual carburetor is assigned a different identifier. The circuit draws power from the R.F. carrier signal, when received, which eliminates the need for any discrete power source for each object circuit.

The R.F search signals are generated by an R.F. signal generator which produces a digitally modulated R.F. carrier signal. The frequency of the carrier signal specifies the class of object being sought, while the identity of the specific object is specified by the digital modulation of the carrier. The frequency of the R.F. carrier can be varied over a range of frequencies which cover all classes of objects in a given inventory control system. The R.F. carrier may be modulated using either amplitude modulation or on-off carrier modulation. In addition, the R.F. carrier signal contains the energy used to power the individual circuits associated with the objects in the inventory, so that no power source (such as a battery) is required for the individual object circuits. The generator is preferably controlled by a computer having the appropriate application programs to implement the system.

The location of a given object is determined in the following manner. The inventory space is virtually partitioned into elemental three-dimensional compartments, which may correspond to the real storage compartments in the inventory space. One or more transmitter coils are physically positioned at each elemental compartment. The R.F. signals are sequentially applied to the transmitter coils for each compartment using an ordered scanning arrangement. In the preferred embodiment, each set of transmitter coils associated to a particular elemental compartment is connected to one output node of a multiple output node scanning switch. The input node of the scanning switch is coupled to the output of the R.F. generator. In operation, the R.F. generator is activated and the R.F. output signals are sequentially applied to each output node of the scanning switch. When an object circuit detects the correct frequency and identifier, the object circuit generates an acknowledgement signal, which is detected by an R.F. identification reader located in or near the compartment containing the acknowledging object circuit. The reader conveys the detect condition to the system computer, which matches the detect condition with the elemental compartment location of the currently active R.F. transmitter coils. In this way, both the physical presence and the location of the object being sought are determined.

The system may also be operated to perform an inventory check for all objects of a given class, or a complete inventory check to test the integrity of the inventory control system. For example, to check the location of all objects of a given class, the R.F generator is activated at the specific frequency for that class of objects (e.g., carburetors) and the specific frequency carrier signal is sequentially modulated with all object identifiers. The resulting R.F. signals are sequentially applied to each set of elemental compartment location coils, and a list is compiled in the system computer of all detect conditions and locations. This list may then be compared with a previously created master list and any discrepancies may be noted and investigated. To check for individual objects of a given class, the R.F. carrier signal of the proper frequency is generated, and this carrier is digitally modulated with the identifiers of the objects being sought, using a previously created master list. The desired master lists may be created by sequentially applying a complete set of digitally modulated R.F. signals at all the frequencies of interest to each set of transmitter coils in the inventory space, and noting the identifiers and locations when detect conditions are obtained.

For a fuller understanding of the nature and advantages of the invention, reference should be made to the ensuing detailed description taken in conjunction with the accompanying drawings.

DETAILED DESCRIPTION OF THE PREFERRED EMBODIMENTS

Figure 1:
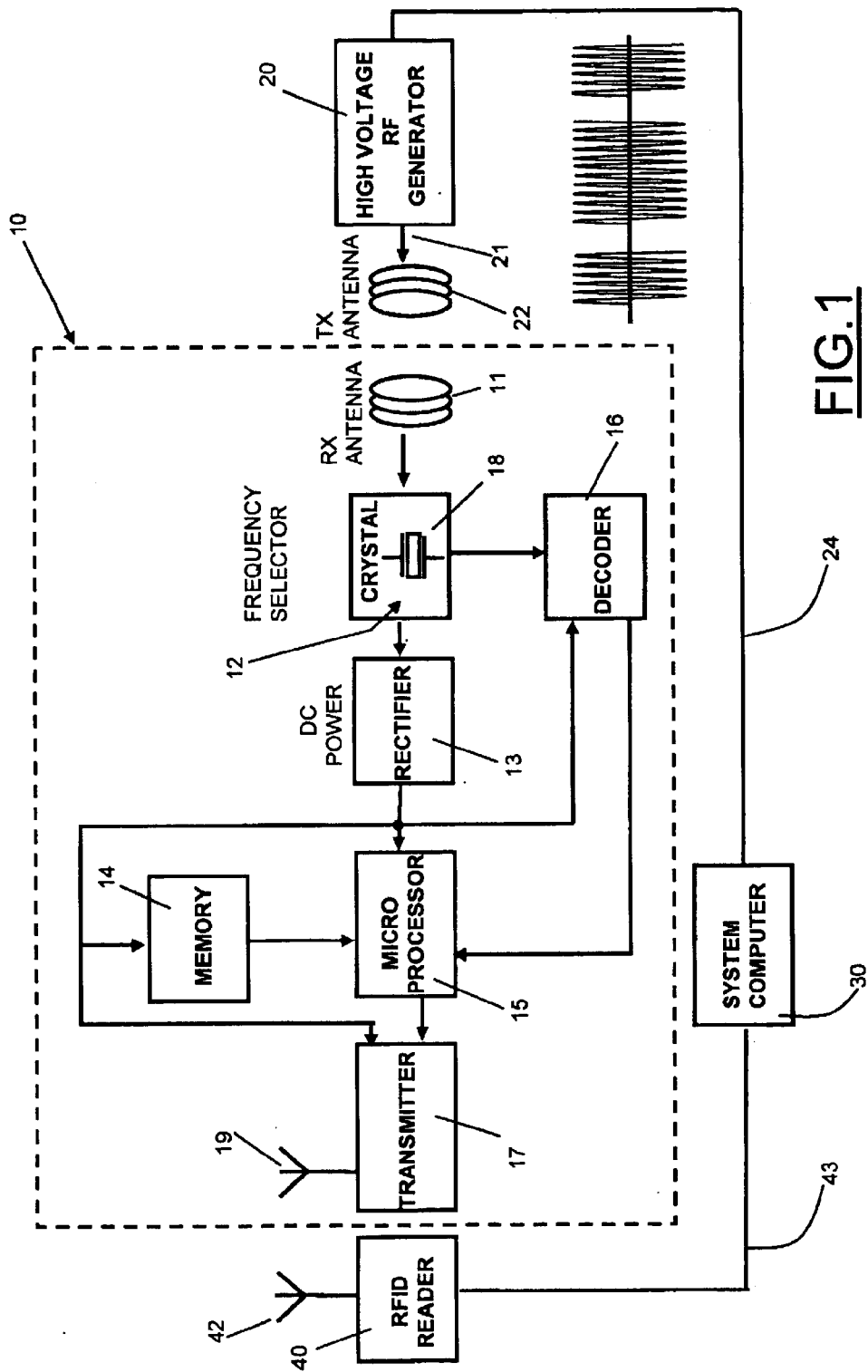
FIG. 1 is a schematic diagram of a preferred embodiment of the invention.

Turning now to the drawings, FIG. 1 is a schematic diagram of a preferred embodiment of the invention. In this Fig., only a single object circuit is shown for clarity. It is understood that many object circuits will be found in most inventory control systems implementing the invention.

With reference to FIG. 1, an object circuit generally designated with reference numeral 10 includes a receiving antenna 11, a frequency selector 12, a rectifier 13, a memory 14, a microprocessor 15, a decode unit 16 and a transmitter 17 with an antenna 19. Receiving antenna 11 receives digitally modulated R.F. signals described more fully below, and any received signals are coupled to frequency selector unit 12. Frequency selector unit 12 includes a crystal 18 having a specific resonant frequency and presents a very low impedance path to received R.F. signals of matching frequency. One output lead from frequency selector 12 is coupled to rectifier 13, which develops D.C. power from the R.F. carrier when signals of matching frequency are received, and this D.C. power is coupled to memory 14, microprocessor 15, and decode unit 16 to provide operating power to these portions of the object circuit 10. Microprocessor 15 coordinates the operation of the active object circuit elements under the control of an appropriate program stored in memory 14. Alternatively, microprocessor 15 may incorporate the program instructions in an internal memory (not illustrated). Memory 14 contains a unique identifier, such as a multi-bit alphanumeric character, which serves to uniquely identify the object circuit and distinguish it from all other object circuits of that class in the inventory control system. Decode unit 16 functions to compare the unique identifier stored in memory 14 with a received identifier demodulated from the received R.F. signals by frequency selector 12. If the two identifiers match, microprocessor 15 enables transmitter 17 to broadcast a low power acknowledgment signal via transmitter antenna 19. The form of the acknowledgment signal may vary according to the dictates of the system designer, and may comprise a simple single frequency continuous carrier signal, a burst carrier, a digitally modulated carrier containing the object circuit identifier, or some other suitable form of acknowledgment signal.

The R.F. signals used to search for one or more given objects are produced by a high voltage R.F. generator 20. Generator 20 has an output 21 coupled to system transmitter antenna 22. Generator 20 is controlled by a system computer 30 via control signals coupled to generator 20 over one or more leads 24. System computer 30 specifies the mode of operation of generator 20, including the frequency of interest and the unique identifier to be sent to the system antenna 22. As suggested by the burst carrier depicted below generator 20, the output signal from generator 20 has two principal components—an R.F. carrier and the encoded identifier information. The identifier information may be encoded using amplitude modulation or, as suggested by the modulated waveform below generator 20, by on-off modulation of the carrier signal.

System computer 30 is coupled to an R.F. identification reader unit 40 via one or more conductive leads 43. Unit 40 includes a receiving antenna 42, which receives the acknowledgment signals from object circuit 10 when a match occurs. This event is sent back to system computer 30 via feedback leads 43 for information feedback purposes.

Figure 2:
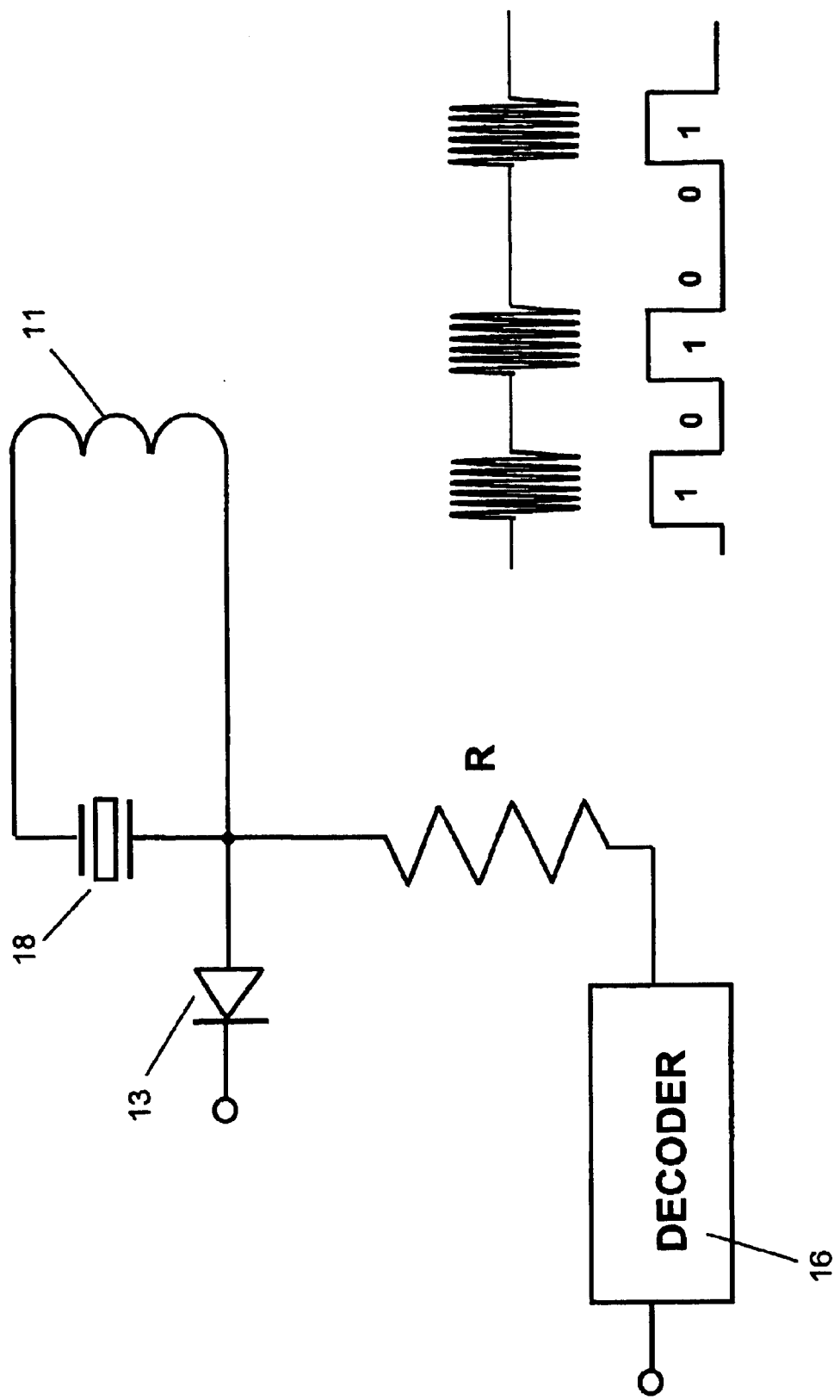
FIG. 2 is a circuit schematic showing a frequency selector circuit.

FIG. 2 illustrates a preferred form of frequency selector unit 12. As seen in this Fig., crystal 18 is coupled in series to receiving antenna 11 and provides a low impedance path to R.F. signals of the proper frequency received by antenna 11. One terminal of crystal is coupled to the anode of rectifier 13, so that power from the received R.F. carrier signal can be rectified and supplied to the active circuit components. The terminal of crystal 18 is also coupled to the input of decode unit 16, which receives the serially encoded unique identifier information and converts this information to binary form in the manner suggested by the binary signal appearing to the right of decode unit 16 in FIG. 2. This binary signal is coupled to microprocessor 15, in which a comparison is made between the received and decoded identifier information and the unique identifier stored permanently in memory 14.

As noted above, although only one object circuit 10 is illustrated in FIG. 1, in actuality a relatively large number of such object circuits are used in a typical inventory control system. Each object circuit 10 is associated to an inventory object, typically by physically attaching the object circuit 10 to the object or article in the inventory control system. If the inventoried object is of a type which permits the following configuration (e.g., a silicon wafer incorporating a number of individual integrated circuits), the object circuit 10 may be physically incorporated into the object itself. Further, the object circuit 10 may be incorporated into or attached to a container for an inventoried object, such as the crate for an automotive engine. In addition, the object circuit 10 may be incorporated into a tag, such as a standard or typical luggage tag. As will be appreciated by those skilled in the art, the manner in which the object circuit is associated to its inventoried object can vary widely. Once associated, however, the object circuit 10 must stay with the inventoried object in a reliable fashion.

Figure 3:
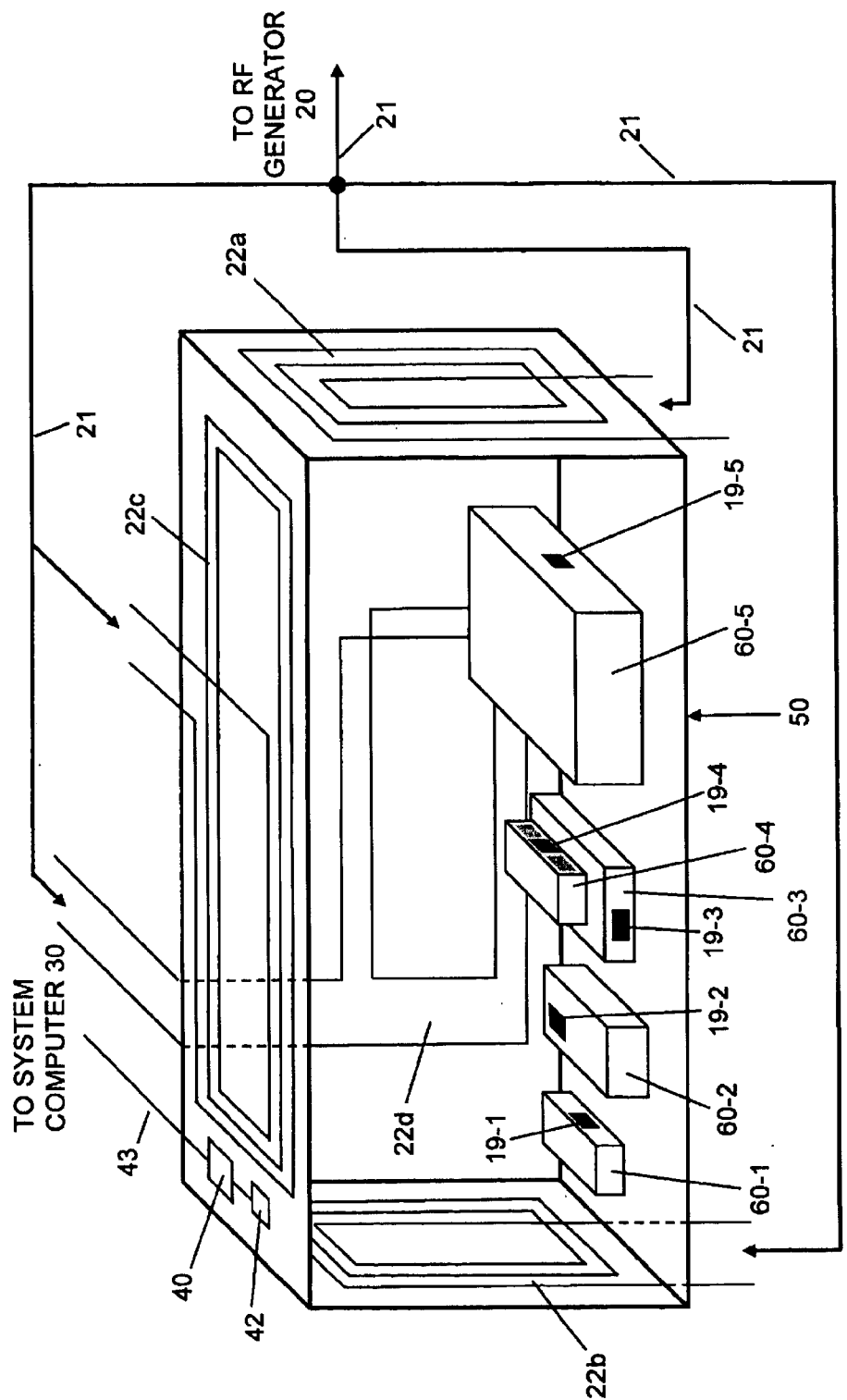
FIG. 3 is a schematic front perspective view of a single elemental storage compartment with several objects in an inventory control system according to the invention.

FIG. 3 illustrates a single storage compartment 50 in an inventory storage space. As seen in this Fig., a plurality of objects 60-1, 60-2, ..., 60-5 are currently located in storage compartment 50. Each object 60-1 through 60-5 has an object circuit 10 associated therewith, with each object circuit having a transmitting antenna 19-1 through 19-5. In order to ensure that all R.F. signals sent from generator 20 will intercept all object circuit receiving antennas 11, a plurality of system transmitter coils 22a through 22-d are mounted on the extreme ends, top and back wall of compartment 50. All coils 22-a through 22-d are connected in such a manner that each one of these coils receives the R.F. signals produced by generator 20.

Mounted on one wall of compartment 50 is the receiving antenna 42 for the RFID circuit associated to compartment 50. Any acknowledgment signal generated by an object circuit 10 associated to any inventory object located in compartment 50 is detected by antenna 42 and RFID circuit 40. This detection event is fed back to system computer 30 via feedback leads 43.

It is noted that the antenna configuration illustrated in FIG. 3 is only by way of example, and that other configurations are within the scope of this invention. For example, additional system transmitter coils 22 may be positioned on the remaining walls of storage compartment 50, if deemed useful or necessary. In addition, additional RFID antennae 42 may be positioned along the volume of compartment 50.

Figure 4:
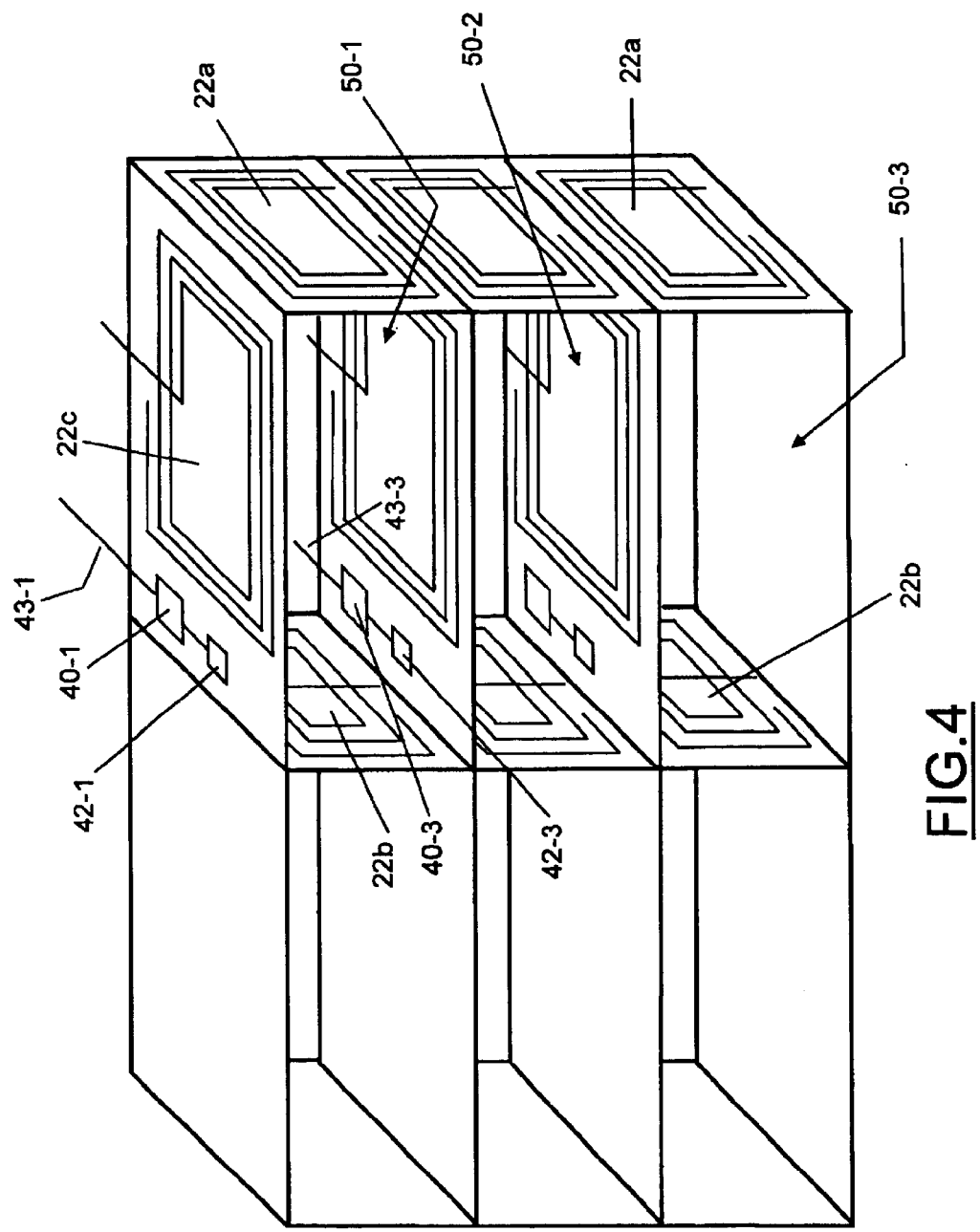
FIG. 4 is a schematic front perspective view showing a plurality of elemental storage compartments for containing objects in an inventory control system according to the invention.

FIG. 4 illustrates a plurality of storage compartments in a storage facility. As seen in this Fig., storage compartments 50-1, 50-2, and 50-3 are stacked vertically, while storage compartments 50-4, 50-5, and 50-6 are also stacked vertically with respect to one another and this group is disposed laterally of the first group. Each one of compartments 50-1 through 50-6 is provided with a set of system transmitter coils 22, and an RFID antenna 42 and RFID detector circuit 40. As illustrated for compartments 50-1 and 50-3, each set of system transmitter coils 22 is individually connected to R.F. generator 20 via a set of leads 22, and each RFID detector circuit 40 is individually connected to system computer 30 via a set of leads 43. Consequently, each individual storage compartment can independently receive R.F. signals from generator 20 and each storage compartment can independently communicate any resulting RFID detection to system computer 30.

Figure 5:
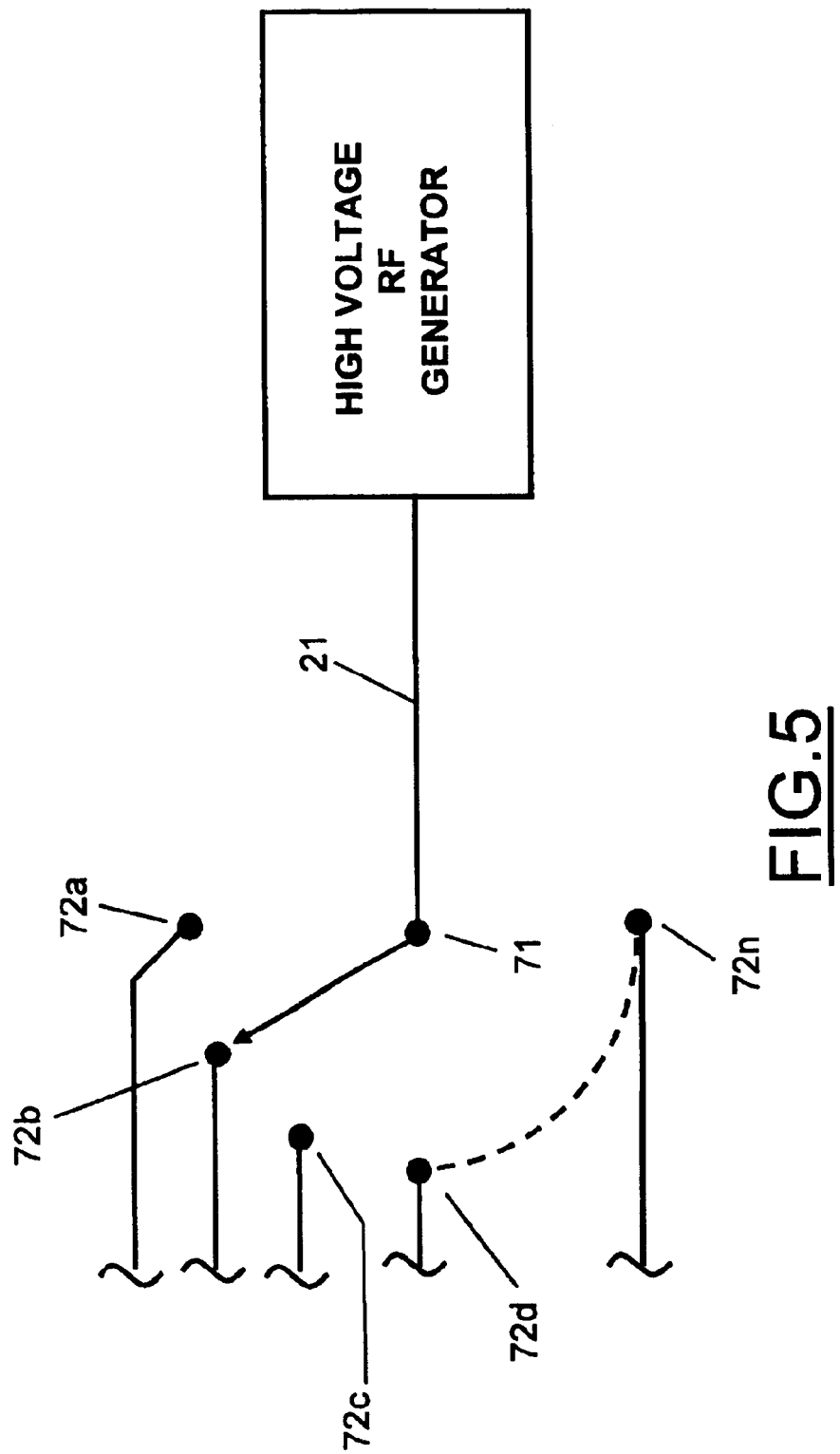
FIG. 5 is a schematic diagram showing an antenna scanning switch.

In operation, to locate a particular inventory object 60, system computer 30 activates generator 20, specifying the carrier frequency for that class of object and the unique identifier for the object being sought. Generator 20 produces the desired R.F. signals, and these signals are sequentially connected to the transmitter coils of each storage compartment. FIG. 5 illustrates one arrangement for providing this sequential connection. As seen in this Fig., the output 21 of generator is connected to the input node 71 of a transmission switch 70 having multiple output nodes 72-a through 72-n, where n is the number of storage compartments in the inventory control system. Input node 71 is sequentially stepped through the several possible connection positions. In each position, the R.F. signals are coupled to the system transmitter coils 22 of a given storage compartment. The switch 70 is maintained in a given position for a period of time sufficiently long to enable each object circuit 10 in the corresponding storage compartment 50 to examine the R.F signals received from the coils 22 for that compartment and generate an acknowledgment signal, if appropriate. If no match occurs for all the objects in a given compartment 50, the switch 70 is stepped to the next position. This process continues until a match occurs or all compartments have been examined.

To locate all inventory objects of a given class, system computer 30 specifies the class frequency, and the unique identifiers of all inventory objects known to be located somewhere in inventory, to generator 20. Generator 20 produces the R.F. carrier signals modulated by the identifiers (preferably by sequentially modulating the carrier with each different identifier), and these signals are sequentially applied through switch 70 to the system transmitter coils 22 of each storage compartment 50. As acknowledgment signals are detected by the various RFID circuits 40, these detection events are fed back to system computer 30, which correlates the detection events with the storage compartments 50 using the current position of switch 70 as a location designator. This process continues until all items have been located, or all compartments have been examined. During this process, any missing inventory objects will be noted by the absence of any acknowledgment response.

A master list of all objects in inventory can be created in a number of different ways. One technique proceeds by attaching an object circuit 10 having a crystal 18 of known frequency and a known identifier to the inventory object 60, entering this information into system computer 30, and repeating these steps for all objects to be placed in inventory. As objects are added to and removed from inventory, the master list is updated by a system operator. Another technique proceeds by placing an inventory object 60 having an object circuit 10 of unknown frequency and/or identifier in the proximity of a system transmitter coil 22, activating generator 20 to sequentially sweep all system frequencies and identifiers, and noting the frequency and digital identifier information when an acknowledgment response is generated by the object circuit 10.

To check the inventory space for integrity, a similar sweeping process is performed, noting the absence of any acknowledgment responses which should have been received, using the inventory master list.

It is important to note that each inventory object 60 is intrinsically independent of storage location 50. Stated differently, any inventory object 60 can be placed in any storage compartment in the storage facility and still be accounted for. Consequently, there is no need to create and periodically verify a master list which correlates object locations with inventory objects.

In the system described above, the power output of generator 20 must be relatively high due to the relatively large volume of space required for typical inventory operations of the type to which the invention applies. More particularly, in a warehousing operation, the volume of warehouse space may equal or even exceed 50,000 square feet. In order to provide adequate broadcast coverage for the R.F. signals while still staying within the broadcast radiation restrictions of the FCC (or other broadcast radiation control authority), the system antennas 22 should be closely coupled to the receiver antennas 11 in the object circuits. This requires extensive cabling from the site of the generator to the individual locations of the compartments 50 used to store the objects 60 in inventory. In some applications of the invention, it may be feasible to reduce the cabling requirements, and the power output requirements for generator 20, by using wireless transmission of the R.F. signals from generator 20 to additional local system receiving antennas positioned at the location of the storage compartments. These system receiving antennas are coupled to local power amplifiers positioned at the individual storage compartments, which boost the received R.F. signals and transmit the boosted signals locally to the interior volume of the associated storage compartment. This arrangement has the advantage of permitting the use of a lower power system generator 20, but requires access to electrical power at each storage compartment site (which is not always convenient).

Another modification to the system described above is the provision of wireless transmission of the RFID detection signals from the individual storage compartments to the system computer 30. This eliminates the need for individual RFID detection circuits 40 at each storage compartment, since the signal from each RFID antenna 42 may be detected by a series of repeater stations distributed throughout the storage facility.

As will now be apparent, inventory control systems incorporating the invention provide a number of significant advantages absent from the prior art. Firstly, since the invention provides an automatic indication of the location of the sought inventory object, the time to find and retrieve an object can be significantly reduced. In addition, the integrity of the entire inventory contents can be easily checked on a periodic or ad hoc basis in a relatively short period of time, and a list of missing inventory objects can be automatically compiled by the system computer 30. Moreover, the use of object circuits 10 to signal the location of a specific object eliminates the need to separately identify each object by using specific descriptors attached to each object Inventory control systems incorporating the invention may also be modified using the computer to add new inventory objects, delete inventory objects removed from inventory, and to rearrange the grouping of objects.

As will be appreciated by those skilled in the art, the invention has wide application to many different fields. In general, the invention can be used in any collective object management system in which the need exists for a technique for rapidly identifying a given class or type of object from a collection of objects. For example, in an automotive parts warehouse operation, the objects may be individual vehicle parts (such as carburetors, alternators, gaskets or the like) stored in bins on shelves. In a manufacturing operation, the objects may be the individual items manufactured in the plant (such as different types of integrated circuits manufactured by an integrated circuits manufacturer) contained in individual packages. In any application, the object circuit and identifier associated to a specific object are closely coupled to the object itself and electrically coupled to the R.F. generator so that the circuits can respond to the reception of an R.F. signal of the correct frequency and identifier and produce the acknowledgment in such a way that a human operator can locate the object sought (or the absence of such an object).

Although the above provides a full and complete disclosure of the preferred embodiments of the invention, various modifications, alternate constructions and equivalents will occur to those skilled in the art. For example, while switch 70 has been described and illustrated as an electromechanical stepping switch, other types of scanning switches may be used without departing from the spirit and scope of the invention. Therefore, the above should not be construed as limiting the invention, which is defined by the appended claims.

What is claimed is:

1. An object circuit for use in an r.f. identification system for locating a specific object by generating identification signals of a specific frequency assigned to a given object, said object circuit including a receiving antenna, a crystal directly connected to said receiving antenna, said crystal having a resonant frequency equal to the frequency assigned to the associated object, and circuitry coupled to said crystal for responding to a signal of said assigned frequency received by said object circuit, said circuitry including a processor for generating response signals when said crystal resonates in response to receipt of a signal of said assigned frequency, and a rectifier circuit coupled between said crystal and said processor for providing electrical power to said processor from the received signal of said assigned frequency.

2. The circuit of claim 1 wherein said object circuit further includes a memory for storing a unique identifier for the associated object; wherein said processor means is coupled to said crystal and said memory for comparing said unique identifier with an identifier component of a received signal of the resonant frequency of said crystal; and acknowledgement means coupled to said processor means for generating an acknowledgment signal when the stored identifier matches the received identifier component.

* * * * *